US008594613B2

(12) United States Patent
Daly (10) Patent No.: US 8,594,613 B2
(45) Date of Patent: *Nov. 26, 2013

(54) MAPPING COMMERCIAL MOBILE ALERT SERVICE MESSAGES TO CELL BROADCASTS

(75) Inventor: Brian K. Daly, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 356 days.

This patent is subject to a terminal disclaimer.

(21) Appl. No.: 12/574,951

(22) Filed: Oct. 7, 2009

(65) Prior Publication Data

US 2011/0081883 A1 Apr. 7, 2011

(51) Int. Cl.
*H04M 11/04* (2006.01)

(52) U.S. Cl.
USPC ..... 455/404.1; 455/466; 455/521; 455/404.2; 455/414.1; 455/3.01

(58) Field of Classification Search
USPC ........ 455/404.1, 466, 3.01, 521, 404.2, 414.1
See application file for complete search history.

(56) References Cited

U.S. PATENT DOCUMENTS

| 2005/0037758 | A1* | 2/2005 | Rimoni | 455/436 |
| 2010/0015943 | A1* | 1/2010 | Karl et al. | 455/404.1 |
| 2010/0075626 | A1* | 3/2010 | Titus et al. | 455/404.1 |
| 2010/0124898 | A1* | 5/2010 | Qu et al. | 455/404.1 |

FOREIGN PATENT DOCUMENTS

WO WO 2011/043975 4/2011

OTHER PUBLICATIONS

3GPP TS 123 041 v.3.5.0, Mar. 2006, ETSI Technical Specification, pp. 1-34.*

International Patent Application No. PCT/US2010/050811: International Search Report dated Jan. 13, 2011, 13 pages.
"3$^{rd}$ Generation Partnership Project; Technical Specification Group Core Network and Terminals; Technical Realization of Cell Broadcast Service (CBS) (Release 9)," 3GPP Standard; 3GPP TS 23.041, 3$^{rd}$ Generation Partnership Project (3GPP), Mobile Competence Centre; 650 Route des Lucioles; F-06921 Sophia-Antipolis Cedex, France, V9.1.0, Sep. 1, 2009., 1-44, XP050362190.
ATIS TIA: "Joint ATIS/TIA CMAS Mobile Device Behavior Specification," online, vol. TIA J-STD-100, Jan. 1, 2009, 1-20, XP002612045.
"Liaison Statement to ITU-T Study Group2," 3GPP Draft; GP-090041, 3$^{rd}$ Generation Partnership Project (3GPP), Mobile Competence Centre; 650 Route des Lucioles; F-06921 Sophia-Antipolis Cedex France, vol. TSG Geran, No. 41, Malta; 20090216, Feb. 5, 2009, XP 050414332, 4 pages.
Daly, et al., "Commercial Mobile Alert Service (CMAS) Section 8.1, 8.2. & 8.3 of the CMAS VIA GSM/UMTS Cell Broadcast Service Specification," 3GPP2-Drafts, 2500 Wilson Boulevard, Suite 300, Arlington, Virginia 22201, USA, Mar. 2008, 1-10, XP040479625.
Daly, et al., "Commercial Mobile Alert Service (CMAS) Functional Architecture and Interfaces for GSM/UMTS," 3GPP2-Drafts, 2500 Wilson Boulevard, Suite 300, Arlington, Virginia 22201, USA, Mar. 2008, 1-3, XP040487550.

* cited by examiner

*Primary Examiner* — Khalid Shaheed
(74) *Attorney, Agent, or Firm* — Woodcock Washburn LLP (57) ABSTRACT

Cell broadcast protocols are utilized to distribute emergency alerts to mobile devices. Emergency alerts may be received from an emergency provider or governmental agency. Parameters of an emergency alert may be derived and mapped to parameters of a cell broadcast message, which may then be transmitted to mobile devices. The mobile devices may be configured to compared parameters of the cell broadcast message to a search list or exclusion list stored on the mobile device, and present the contents of the cell broadcast message to the user based on the comparison.

20 Claims, 8 Drawing Sheets

MAPPING COMMERCIAL MOBILE ALERT SERVICE MESSAGES TO CELL BROADCASTS

BACKGROUND

The Commercial Mobile Alert System (CMAS) was established by the Federal Communications Commission (FCC) to allow wireless service providers to send emergency alerts to their subscribers. Such alerts are initially intended to be in the form of text messages, but may also take the form of audio and video alerts. The CMAS network will allow emergency service agencies, such as the Federal Emergency Management Agency (FEMA), to accept and aggregate alerts from federal, state, and local emergency operations centers, and send the alerts over a secure interface to wireless providers. The wireless providers can then distribute the alerts to their customers.

While the FCC has proposed and adopted the network structure, technical requirements, and operating procedures for the CMAS, wireless service providers that participate in the CMAS must develop their own systems to receive alerts from FEMA and distribute them to their customers. Such systems must allow the wireless service providers to target individual geographical areas, such as counties, for distribution of emergency alerts.

There are currently three types of emergency alerts. Presidential Alerts that relate to national emergencies, Imminent Threat Alerts that relate to emergencies where life or property is at risk, such as hurricanes or tornadoes, and Child Abduction Emergency/AMBER Alerts that relate to missing or endangered children due to an abduction or runaway situation. Subscribers may be able to opt-out of receiving Imminent Threat and Child Abduction/AMBER alerts, but may not be permitted to opt-out of Presidential Alerts.

SUMMARY

Systems and methods are disclosed for receiving an emergency alert, mapping fields and/or parameters of the emergency alert to a cell broadcast message, and transmitting the cell broadcast message to user devices. In one embodiment, an emergency alert message type may be mapped to a cell broadcast message identifier parameter. In another embodiment, emergency alert contents may be mapped to a cell broadcast message information parameter.

Systems and methods are also disclosed for filtering cell broadcasts at a user device or on a network based on the mapped fields and/or parameters. In one embodiment, a user device may maintain a user-definable search list or a user-definable exclusion list that contains a list of emergency alert message types. If a received cell broadcast message has an associated emergency alert message type in its cell broadcast message identifier parameter that is also on the search list, or is not on the exclusion list, then the message may be displayed to the user. If the received cell broadcast message has an associated emergency alert message type in its cell broadcast message identifier parameter that is not on the search list, or is on the exclusion list, then the message may be discarded. Other embodiments and aspects of the present disclosure are also described herein.

BRIEF DESCRIPTION OF THE DRAWINGS

Various exemplary embodiments of this invention will be described in detail, with reference to the following figures, wherein like numerals represent like elements, and wherein.

DETAILED DESCRIPTION OF ILLUSTRATIVE EMBODIMENTS

In one embodiment, CMAS emergency alerts may be provided using Universal Mobile Telecommunications System (UMTS) and/or Global System for Mobile communications (GSM) cell broadcast technologies. Methods and systems are described herein for mapping of emergency alerts to a cell broadcast. Because subscribers have the ability to opt-out of receiving emergency alerts, this disclosure also provides methods and systems for using a cell broadcast message identifier as a means to manage subscriber opt-out capability.

Figure 1:
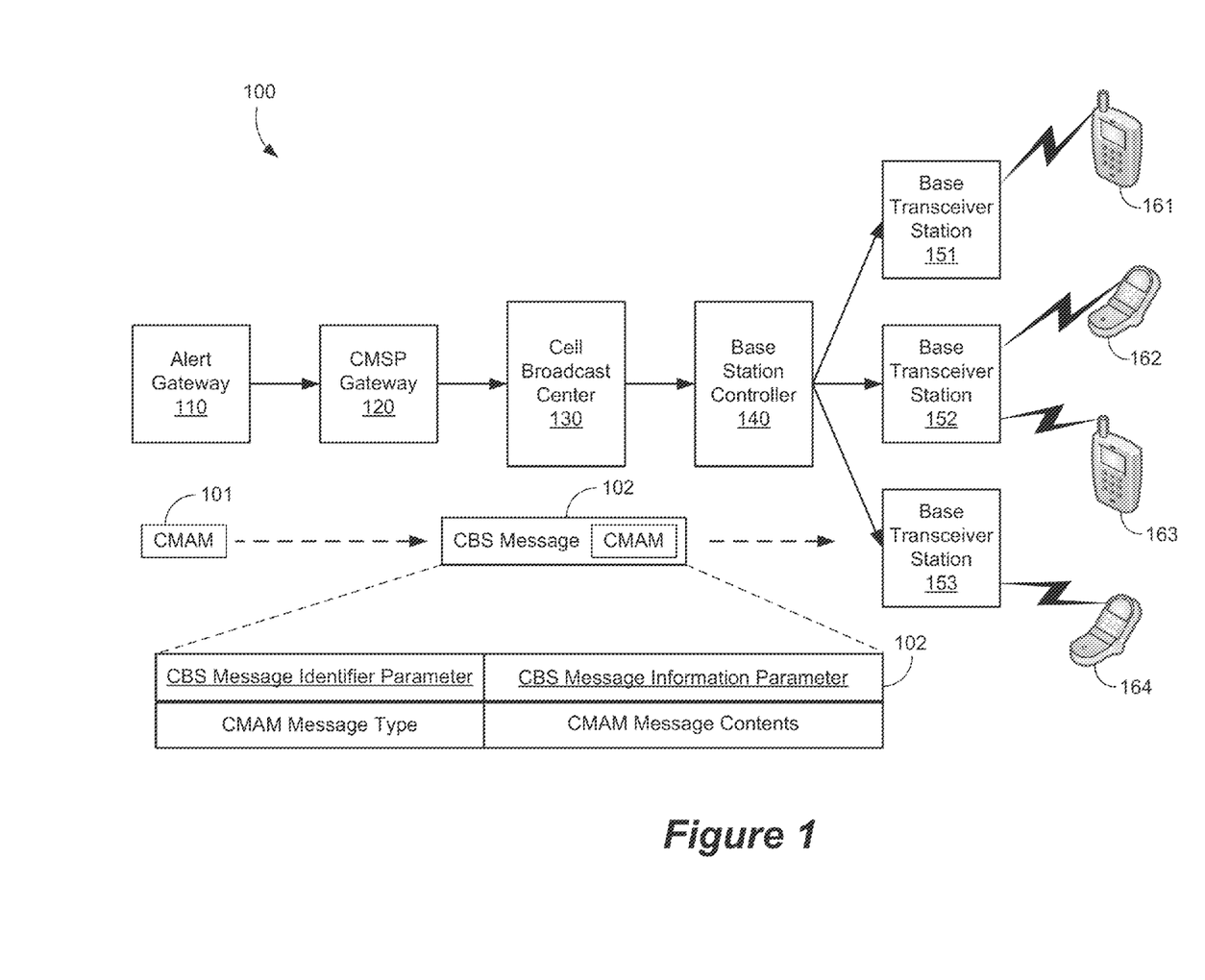
FIG. 1 is a block diagram of a non-limiting, exemplary system architecture in which mapping of commercial mobile alert service messages to cell broadcasts may be implemented.

FIG. 1 illustrates an exemplary architecture 100 that may be used to provide emergency alerts to mobile devices using GSM technologies. An alert generated by a governmental or emergency services agency may be referred to as a Commercial Mobile Alert Message (CMAM). CMAM 101 may be generated at or otherwise provided to a wireless carrier or wireless service provider, referred to herein as a Commercial Mobile Service Provider (CMSP), by Alert Gateway 110, which may be a Commercial Mobile Alert System (CMAS) alert gateway, and may be operated by a governmental or emergency services agency. Alert Gateway 110 may transmit CMAM 101 to CMSP Gateway 120. CMSP Gateway 120 may be dedicated to receiving CMAMs from one or more alert gateways such as Alert Gateway 110, and may communicate with Alert Gateway 110 using a secure data connection. All other configurations of alert gateways and CMSP gateways, and all other means of communication between such gateways, including wired, wireless, secure, unsecure, encrypted, and unencrypted, are contemplated as within the scope of the present disclosure.

In one embodiment, CMAM 101 may be transmitted from Alert Gateway 110 to CMSP Gateway 120, and may be limited to 90 characters and may be based on Common Alert Protocol (CAP) key fields. Upon receiving CMAM 101 from Alert Gateway 110, CMSP Gateway 120 may process CMAM 101, including formatting CMAM 101 as necessary to provide the alert to mobile devices serviced by the CMSP. Further processing may be performed to determine a set of the cells within the CMSP network that are to be provided with CMAM 101 for transmission to users and devices within that cell. In the event that multiple CMAMs are received by CMSP Gateway 120, CMSP Gateway 120 will process the CMAMs in a first-in first-out manner, except for Presidential Alert CMAMs, which may be processed before all other non-Presidential Alert CMAMs. Alternatively, other priority schemes may be used that determine CMAM priority based on various characteristics of CMAMs.

Once CMAM 101 is processed, CMSP Gateway 120 may transmit processed CMAM 101 to Cell Broadcast Center 130. In an alternative embodiment, CMAM 101 may not be altered by CMSP Gateway 120, and may be transmitted to Cell Broadcast Center 130 unchanged. Cell Broadcast Center 130 may transmit CMAM 101 to Base Station Controller 140 as a cell broadcast service (CBS) message containing the contents of CMAM 101, such as CBS Message 102. The contents of CMAM 101 and relevant data may be mapped to fields and/or parameters of a CBS message, such as a Write/Replace message of the Request/Indication primitive type as described in the 3GPP TS 23.041 v3.5.0 technical specification dated June 2006, which is hereby incorporated by reference in its entirety. As seen in FIG. 1, contents or data relating to CMAM 101 may be mapped to parameters of CBS Message 102. For example, a CMAM message type may by associated with the CBS message identifier parameter as shown in FIG. 1, and the CMAM message contents may be mapped to a CBS message information parameter. Attributes of CMAM 101, such as the CMAM message type, may be derived from CMAM 101 by Cell Broadcast Center 130 and inserted into CBS message 102, mapped directly from CMAM 101 to CBS Message 102, or determined from CMAM 101 and included or not included in CBS Message 102 as desired. Other mappings and processing may be used to map or derive CMAM data for the generation of a CBS message, and all such mappings and processing are contemplated as within the scope of the present disclosure.

Upon receipt of CBS Message 102, Base Station Controller 140 may transmit CBS Message 102 to the appropriate base stations, such as Base Transceiver Stations 151, 152, and 153. Base Transceiver Stations 151, 152, and 153 may transmit CBS Message 102 to mobile equipment (ME) such as wireless devices 161, 162, 163, and 164, thereby alerting the users of these devices to the contents of CMAM 101 represented by or contained with CBS message 102.

Figure 2:
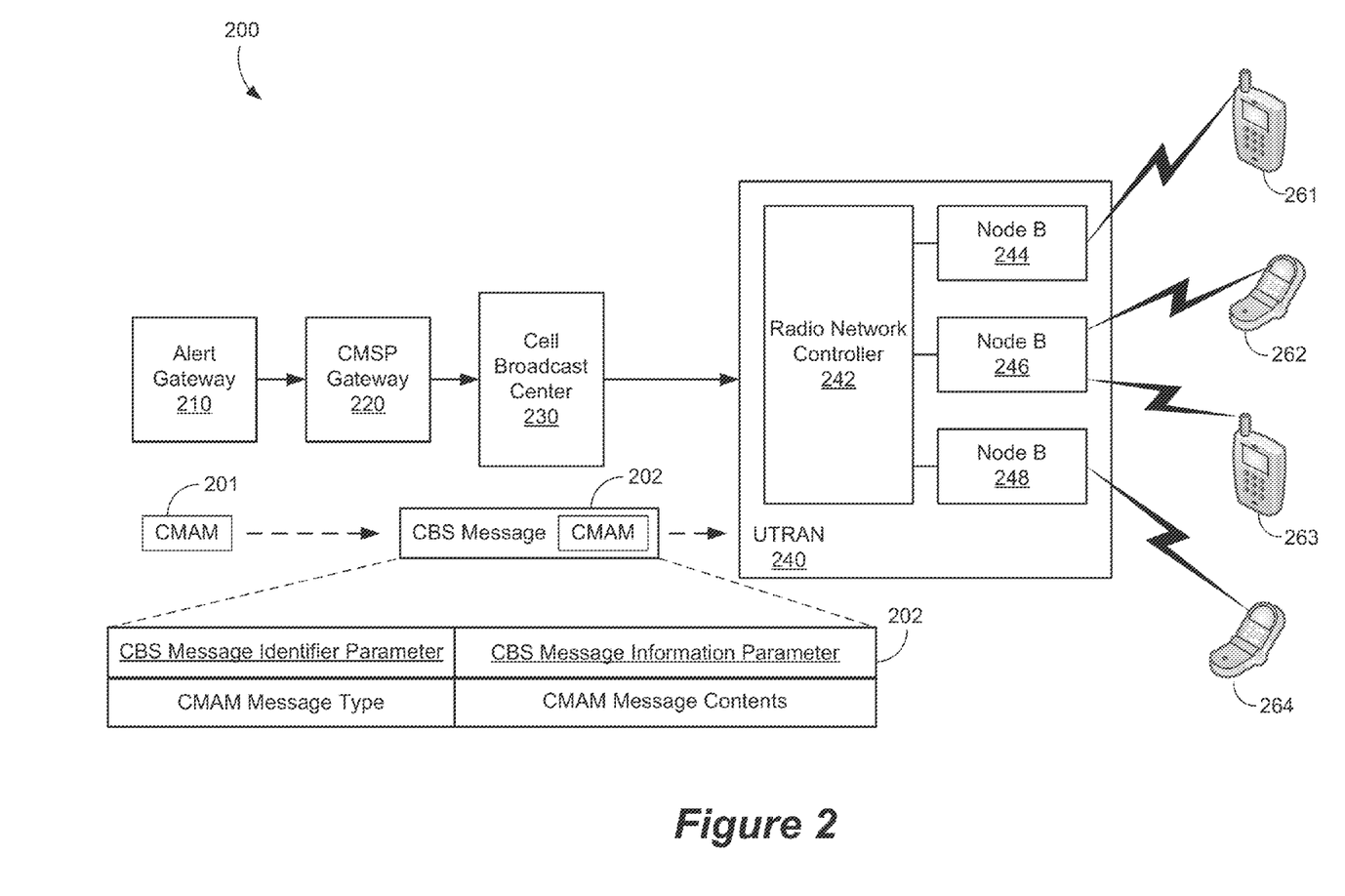
FIG. 2 is another block diagram of a non-limiting, exemplary system architecture in which mapping of commercial mobile alert service messages to cell broadcasts may be implemented.

FIG. 2 illustrates an exemplary architecture 200 that may be used to provide emergency alerts to mobile devices using UMTS technologies. CMAM 201 may be generated at or otherwise provided to a CMSP by Alert Gateway 210, which may be operated by a governmental or emergency services agency. Alert Gateway 210 may transmit CMAM 201 to CMSP Gateway 220. CMSP Gateway 220 may be dedicated to receiving CMAMs from one or more alert gateways such as Alert Gateway 210, and may communicate with Alert Gateway 210 using a secure data connection. All other configurations of alert gateways and CMSP gateways, and all other means of communication between such gateways, including wired, wireless, secure, unsecure, encrypted, and unencrypted, are contemplated as within the scope of the present disclosure.

In one embodiment, CMAM 201 may be transmitted from Alert Gateway 210 to CMSP Gateway 220 and may be limited to 90 characters and may be based on Common Alert Protocol (CAP) key fields. Upon receiving CMAM 201 from Alert Gateway 210, CMSP Gateway 220 may process CMAM 201, including formatting CMAM 201 as necessary to provide the alert to mobile devices serviced by the CMSP. Further processing may be performed to determine a subset of the cells within the CMSP network that are to be provided with CMAM 201 for transmission to users and devices within that cell. In the event that multiple CMAMs are received by CMSP Gateway 220, CMSP Gateway 220 may prioritize the multiple CMAMs as described above in regard to FIG. 1 and CMSP Gateway 120.

Once CMAM 201 is processed, CMSP Gateway 220 may transmit processed CMAM 201 to Cell Broadcast Center 230. In an alternative embodiment, CMAM 201 may not be altered by CMSP Gateway 220, and may be transmitted to Cell Broadcast Center 230 unchanged. Cell Broadcast Center 230 may transmit CMAM 201 to UMTS Terrestrial Radio Access Network (UTRAN) 240 as a cell broadcast service (CBS) message containing the contents of CMAM 201, such as CBS Message 202. The contents of CMAM 201 and relevant data may be mapped to fields and/or parameters of a CBS message, such as a Write/Replace message of the Request/Indication primitive type as described in the 3GPP TS 23.041 technical specification. As seen in FIG. 2, contents or data relating to CMAM 201 may be mapped to parameters of CBS Message 202. For example, a CMAM message type may by associated with the CBS message identifier parameter as shown in FIG. 2, and the CMAM message contents may be mapped to a CBS message information parameter. Attributes of CMAM 101, such as the CMAM message type, may be derived from CMAM 101 by Cell Broadcast Center 130 and inserted into CBS message 102, mapped directly from CMAM 101 to CBS Message 102, or determined from CMAM 101 and included or not included in CBS Message 102 as desired. Other mappings and processing may be used to map or derive CMAM data for the generation of a CBS message, and all such mappings and processing are contemplated as within the scope of the present disclosure.

UTRAN 240 may include Radio Network Controller 242, which may provide control functionality for Node Bs 244, 246, and 248. As known to those skilled in the art, Node Bs in a UMTS network provide the function of base transceiver stations. Node Bs 244, 246, and 248 may transmit CBS message 202 to mobile equipment (ME) such as wireless devices 261, 262, 263, and 264, thereby alerting the users of these devices to the contents of CMAM 201 represented by or contained within CBS message 202.

In a GSM network, at the interface between a cell broadcast center and a base station controller, such as Cell Broadcast Center 130 and Base Station Controller 140, CMAM 101 may be transmitted as CBS message 102. CBS Message 102 may be a message type adhering to network standards, such as the 3GPP GSM standard. In one embodiment, CBS Message 102 may be a Write/Replace message of the Request/Indication primitive type as described in the 3GPP TS 23.041 technical specification. CBS Message 102 may be uniquely identified by four parameters. These parameters may include a message identifier, a serial number, a cell identifier, and a channel indicator. In a UTMS network, at the interface between a cell broadcast center and a radio network controller, such as Cell Broadcast Center 230 and Radio Network Controller 242, CMAM 201 may be transmitted as CBS message 202, and may also be a Write/Replace message of the Request/Indication primitive type as described in 3GPP TS 23.041 technical specification. In a UTMS network, CBS message 202 may be uniquely identified by three parameters. These parameters may include a message identifier, a serial number, and a cell identifier.

The message identifier parameter used in either type of technology may contain fields that identify the source and/or type of the CBS message. In one embodiment, this message identifier parameter may be a parameter of the Write/Replace message of the Request/Indication primitive type as described in the 3GPP TS 23.041 technical specification. In one example, a source field is provided that may contain "Alert Gateway", or a value or encoding indicating "Alert Gateway", indicating that the CBS message originated at Alert Gateway 110 or 210. Alternatively, or in addition to identifying the source of the CBS message, the CBS message identifier parameter may include fields that identify the type of CMAS message associated with the CMAM. For example, a type field of the message identifier parameter may be set to "CMAS-Presidential", "CMAS-Extreme-Alert-Message", "CMAS-Severe-Alert-Message", or "CMAS-Amber-Alert". Within the type field, other fields may be used to indicate in a more granular fashion the type of message. For example, a "CMAS-Extreme-Alert-Message" type may include a "severity" field set to "extreme", an "urgency" field set to "immediate", and a "certainty" field set to "observed" or "likely". Similarly, a "CMAS-Severe-Alert-Message" may include a "severity" field set to "severe", an "urgency" field set to "immediate" or "expected", and a "certainty" field set to "observed" or "likely". Note that all of these fields and settings within the message identifier parameter may be set to binary indicators and/or other encodings of such conditions that may be interpreted by a computing device to determine a condition or setting as indicated herein. Each field described herein may be represented by any number of bits, and may be written, stored, and read in any effective manner to allow such fields to be interpreted by computing devices.

The message identifier parameter may be transmitted transparently from a cell broadcast center, such as Cell Broadcast Center 130 or Cell Broadcast Center 230, through the CMSP network to the mobile equipment. Thus, mobile equipment receiving a CMAM in the form of a CBS message, such as wireless devices 161-164 and 261-264, may receive the message identifier as transmitted by the a cell broadcast center. Such mobile equipment may then use the message identifier to determine whether to present the CBS message to the user, as shown in FIG. 3.

Figure 3:
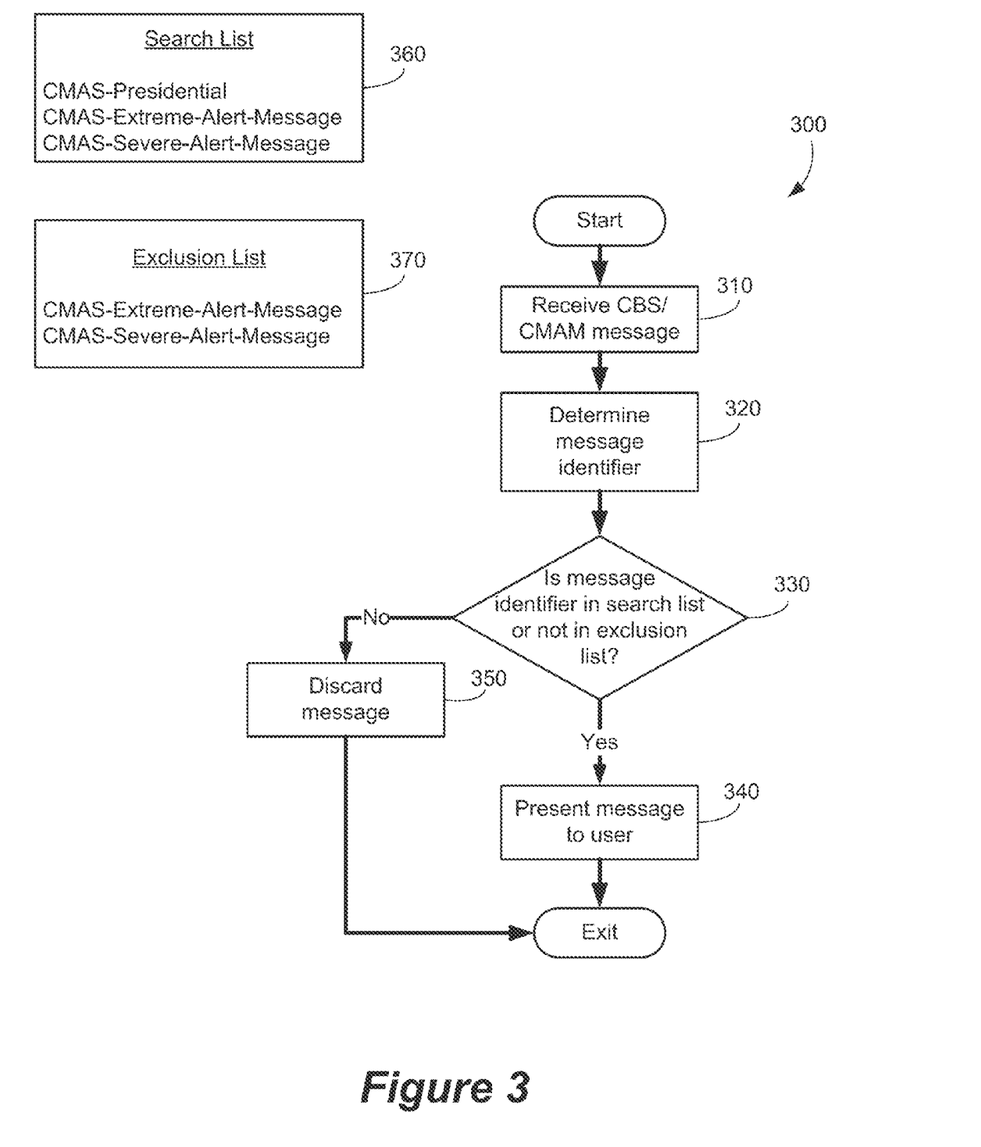
FIG. 3 is a flow chart of a non-limiting, exemplary method of processing a cell broadcast representing a commercial mobile alert service.

In FIG. 3, method 300 is illustrated. Method 300 may be performed by mobile equipment of any type, including wireless devices such as wireless telephones, wireless computers, personal data assistants, etc. At block 310, a wireless device receives a CBS message containing a CMAM as described herein. The message may be received wirelessly through wireless technology such as GSM and UTMS, but may also be received via any other form of wireless technology, such as WiFi, WiMAX, Long Term Evolution (LTE), or any other wireless communications means. The message may also be received via wired communications means.

At block 320, the wireless device (in one embodiment operating software installed on such device) may determine the mobile identifier from the CBS message. This may be accomplished using any effective means. The message identifier may be one of several types, including "CMAS-Presidential", "CMAS-Extreme-Alert-Message", "CMAS-Severe-Alert-Message", and "CMAS-Amber-Alert". At block 330, the wireless device may determine if the message identifier determined at block 320 is in a search list, such as search list 360. For example, if the message identifier is "CMAS-Extreme-Alert-Message", the message may be identified as the type of message permitted to be displayed to a user if the wireless device compares the message identifier to a search list such as search list 360. However, if the message identifier is "CMAS-Amber-Alerts", the message may be identified as the type of message that is not permitted to be displayed to the user if the wireless device compares the message identifier to a search list such as search list 360. If the message identifier is in the search list, the message may be presented to the user at block 340. If it is not in the search list, the message may be discarded at block 350.

In an alternative embodiment, rather than a search list containing message types that are permitted to be displayed to a user, a wireless device may have a configured exclusion list which lists message types prohibited from being displayed to a user, such as exclusion list 370. In such an embodiment, at block 330, the wireless device may determine whether the message identifier is or is not included in the exclusion list. For example, if the message identifier is "CMAS-Extreme-Alert-Message", the message may be identified as the type of message that is not permitted to be displayed to a user if the wireless device compares the message identifier to an exclusion list such as exclusion list 370. However, if the message identifier is "CMAS-Amber-Alerts", the message may be identified as the type of message that is permitted to be displayed to the user if the wireless device compares the message identifier to a search list such as search list 360. If the message identifier is not in the exclusion list, at block 340 the message may be presented to the user. If the message identifier is in the exclusion list, the message may be discarded at block 350.

In some embodiments, rather than evaluating the message identifier as a whole, a wireless device may determine certain fields within a message identifier and compare those files to a search list or exclusion list containing permitted or excluded values for those fields. For example, the wireless device may determine the value for a "certainty", "severity", or "urgency" field and compare that value to associated values in a search list or exclusion list. Any other means of identifying a message and determining whether the message is to be presented to a user are contemplated as within the scope of the present disclosure.

It is contemplated a search list or exclusion list may be configured by the user directly on a wireless device. Alternatively, the user may configure a search list or an exclusion list on the CMSP network through a communication to the CMSP of any effective form. Such a list may then be transmitted to the user's wireless device. When configured on the CMSP, the list may be stored in the CMSP network as well as transmitted to the user device so that the user device can later retrieve it if needed. Alternatively, the user may retrieve the list with a new device when the user replaces a wireless device. The search list or exclusion list may be stored on the wireless device itself or on a storage means communicatively connected to the wireless device, such as a subscriber identity module (SIM). In another alternative, a search list or exclusion list may be stored on the CMSP network, and a CMAM or CBS message may be evaluated before it is transmitted to a user device, thus preventing unnecessary transmission of such messages to user devices. All such embodiments are contemplated as within the scope of the present disclosure.

In some embodiments, certain message types are not permitted to be excluded from user presentation. Software rules may be implemented on a user's device or other device that compares message types to a search list or exclusion list that enforce such a policy. For example, messages of the type "CMAS-Presidential" may not be permitted to be added to an exclusion list, or may be included by default in a search list and not allowed to be removed from the search list. Search lists and exclusions lists may also include or exclude certain message types by default but may allow user adjustment. For example, all message types may be included in a search list by default, but a user may be permitted to remove all of them except for required types, such as "CMAS-Presidential". In embodiments using exclusions lists, no entries may be included in an exclusion list be default, but a user may be able to add all types to the list except for required types, such as "CMAS-Presidential".

In one embodiment, where the CBS message is a Write/Replace message of the Request/Indication primitive type, the contents of a CMAM and the associated parameters needed for processing the CMAM as a CBS message may be embedded in the "CBS-Message-Information-Page-1" parameter of a CBS message. The "CBS-Message-Information-Page-1" parameter may be a parameter of a Write/Replace message of the Request/Indication primitive type as described in the 3GPP TS 23.041 technical specification. Other CBS message parameters, and other parameters of a Write/Replace message of the Request/Indication primitive type, are known to those skilled in the art, and such parameters may be used and are contemplated for use to contain CMAM data. If the CMAM and related data do not exceed the length of the parameter into which they are mapped, then the remaining length of the CBS message parameter may be padded. If the CMAM and related data exceed the length of the CBS message parameter into which they are mapped, then other parameters may contain the remaining data, such as "CBS-Message-Information-Page2" and/or "CBS-Message-Information-Page3" as described for a Write/Replace message of the Request/Indication primitive type in the 3GPP TS 23.041 technical specification.

By using existing GSM and UTMS cell broadcast means to transmit CMAMs, CMSP operators may easily and effectively work with the CMAS to provide alerts to their users. The above described embodiments may be implemented using any type of devices, network elements, network connections, and any combination thereof. Described below are exemplary device and network embodiments that may be used to implement the methods and systems described above. As those skilled in the art will appreciate, alternative means and methods of mapping CMAS messages (CMAMs) to cell broadcasts may be used and all such means and methods are contemplated as within the scope of the present disclosure.

Figure 4:
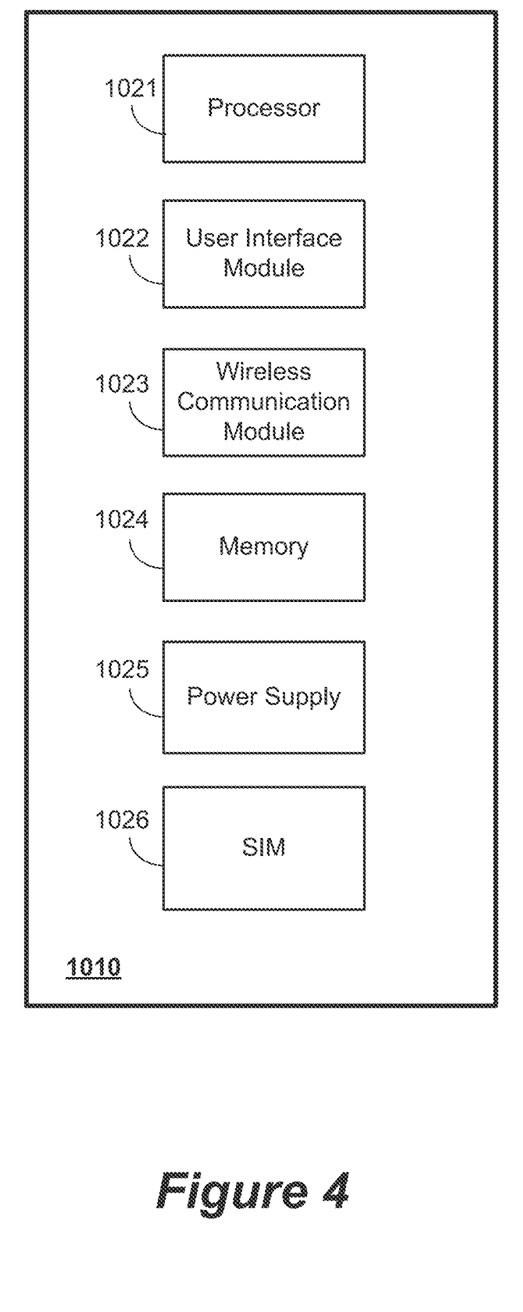
FIG. 4 is a block diagram of a non-limiting, exemplary wireless device that may be used in connection with mapping commercial mobile alert service messages to cell broadcasts.

FIG. 4 illustrates an example wireless device 1010 that may be used in connection with mapping commercial mobile alert service messages to cell broadcasts. References will also be made to other figures of the present disclosure as appropriate. For example, wireless devices 161-164 and 261-264 may each be a wireless device of the type described in regard to FIG. 4, and may have some, all, or none of the components and modules described in regard to FIG. 4. It will be appreciated that the components and modules of wireless device 1010 illustrated in FIG. 4 are illustrative, and that any number and type of components and/or modules may be present in wireless device 1010. In addition, the functions performed by any or all of the components and modules illustrated in FIG. 4 may be performed by any number of physical components. Thus, it is possible that in some embodiments the functionality of more than one component and/or module illustrated in FIG. 4 may be performed by any number or types of hardware and/or software.

Processor 1021 may be any type of circuitry that performs operations on behalf of wireless device 1010. In one embodiment, processor 1021 executes software (i.e., computer readable instructions stored in a computer readable medium) that may include functionality related to transmitting and receiving telephonic communications including CBS messages and/or CMAMs in some form, communicating with, operating, or interfacing with CMSP, and/or running software configured to operate, communicate, or interface with CMSP, for example. User interface module 1022 may be any type or combination of hardware and/or software that enables a user to operate and interact with wireless device 1010, and, in one embodiment, to interact with a system or software enabling the user to view, modify, or delete a CBS message such as those containing CMAM data as described herein, and/or a system or software enabling the user to view, modify, or delete a search list or exclusion list as described herein. For example, user interface module 1022 may include a display, physical and "soft" keys, voice recognition software, microphone, speaker and the like. Wireless communication module 1023 may be any type or combination of hardware and/or software that enables wireless device 1010 to communicate with CMSP equipment, for example, Base Transceiver Stations 151-153, Node Bs 244, 246, and 248, or any other type of wireless communications network or network equipment. Memory 1024 enables wireless device 1010 to store information, such as a search list or an exclusion list or the like. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010.

SIM 1026 may be any type Subscriber Identity Module and may be configured on a removable or non-removable SIM card that allows wireless device 1010 to store data on SIM 1026. In one embodiment, processor 1021 may store one or more search lists or exclusion lists on SIM 1026.

Figure 5:
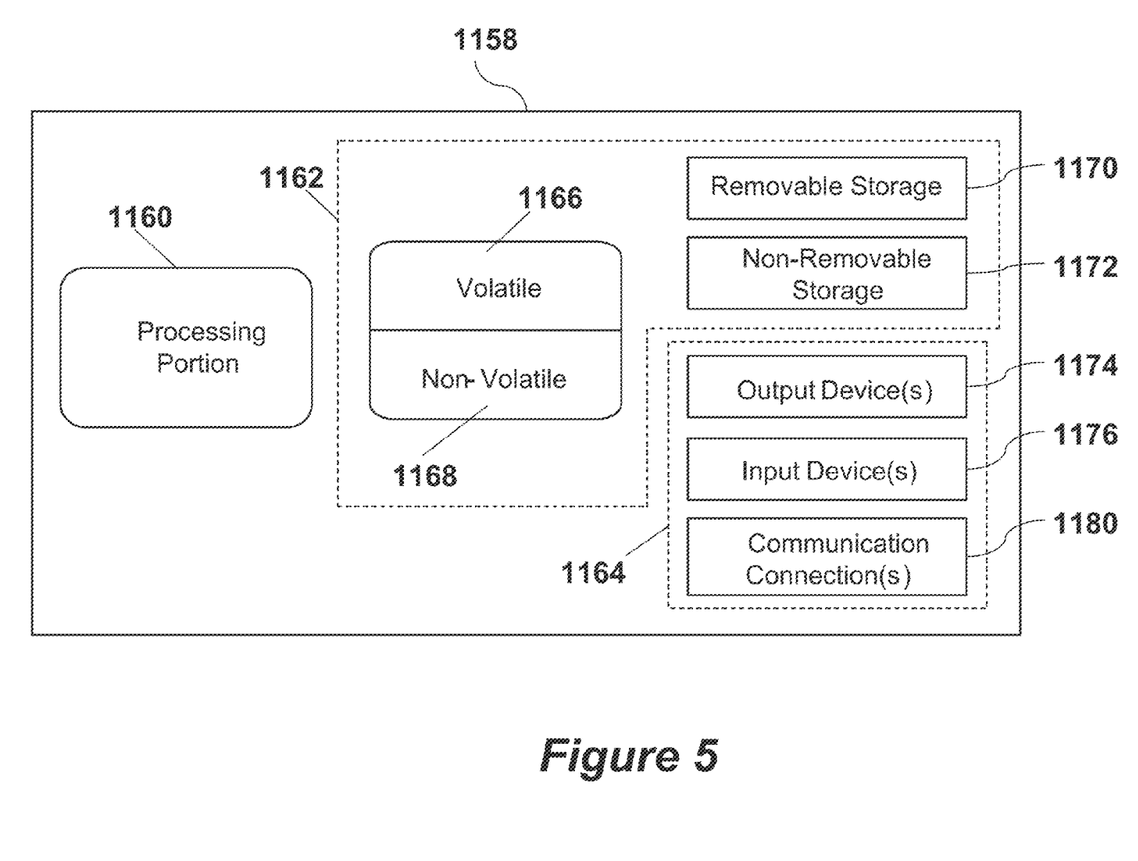
FIG. 5 is a block diagram of a non-limiting, exemplary processor in which mapping of commercial mobile alert service messages to cell broadcasts may be implemented.

FIG. 5 is a block diagram of an example processor 1158 which may be employed in any of the embodiments described herein, including as one or more components of wireless devices 161-164 and 261-264, as one or more components of CMSP equipment or related equipment, such as any component shown in FIGS. 1 and 2, and/or as one or more components of any third party system or subsystem that may implement any portion of the subject matter described herein, such as Alert Gateway 110 or 210. It is emphasized that the block diagram depicted in FIG. 5 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof.

The processor 1158 comprises a processing portion 1160, a memory portion 1162, and an input/output portion 1164. The processing portion 560, memory portion 562, and input/output portion 1164 are coupled together (coupling not shown in FIG. 5) to allow communications between these portions. The input/output portion 1164 is capable of providing and/or receiving components, commands, and/or instructions, utilized to, for example, map CMAMs to CBS messages or any other type of cell broadcast or wireless communications means.

The processor 1158 can be implemented as a client processor and/or a server processor. In a basic configuration, the processor 1158 may include at least one processing portion 1160 and memory portion 1162. The memory portion 1162 can store any information utilized in conjunction with transmitting, receiving, and/or processing CMAMs or cell broadcasts, search lists, exclusion lists, message display applications, telephonic communications, etc. For example, as described above, the memory portion is capable of storing search lists and/or exclusion lists and/or software capable of enabling user manipulation of such lists. Depending upon the exact configuration and type of processor, the memory portion 1162 can be volatile (such as RAM) 1166, non-volatile (such as ROM, flash memory, etc.) 1168, or a combination thereof. The processor 1158 can have additional features/ functionality. For example, the processor 1158 can include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 1158. Any such computer storage media may be part of the processor 1158.

The processor 1158 can also contain the communications connection(s) 1180 that allow the processor 1158 to communicate with other devices, for example through CMSP equipment as illustrated in FIGS. 1 and 2. Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media. The processor 1158 also can have input device(s) 1176 such as keyboard, keypad, mouse, pen, voice input device, touch input device, etc. Output device(s) 1174 such as a display, speakers, printer, etc. also can be included.

CMSP networks and equipment as illustrated in FIGS. 1 and 2 may comprise any appropriate telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how cell broadcasts may be implemented with stationary and non-stationary network structures and architectures in order to map CMAS messages, such as CMAMs, to cell broadcasts. It can be appreciated, however, that methods and systems for mapping CMAMs to cell broadcasts such as those described herein can be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System (UMTS), Frequency Division Duplexing (FDD) and Time Division Duplexing (TDD), High Speed Packet Data Access (HSPDA), cdma2000 1x Evolution Data Optimized (EVDO), Code Division Multiple Access-2000 (cdma2000 3x), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), etc., as well as to other network services that become available in time. In this regard, the systems and methods for mapping CMAS messages to cell broadcasts can be applied independently of the method of data transport, and do not depend on any particular network architecture, or underlying protocols.

Figure 6:
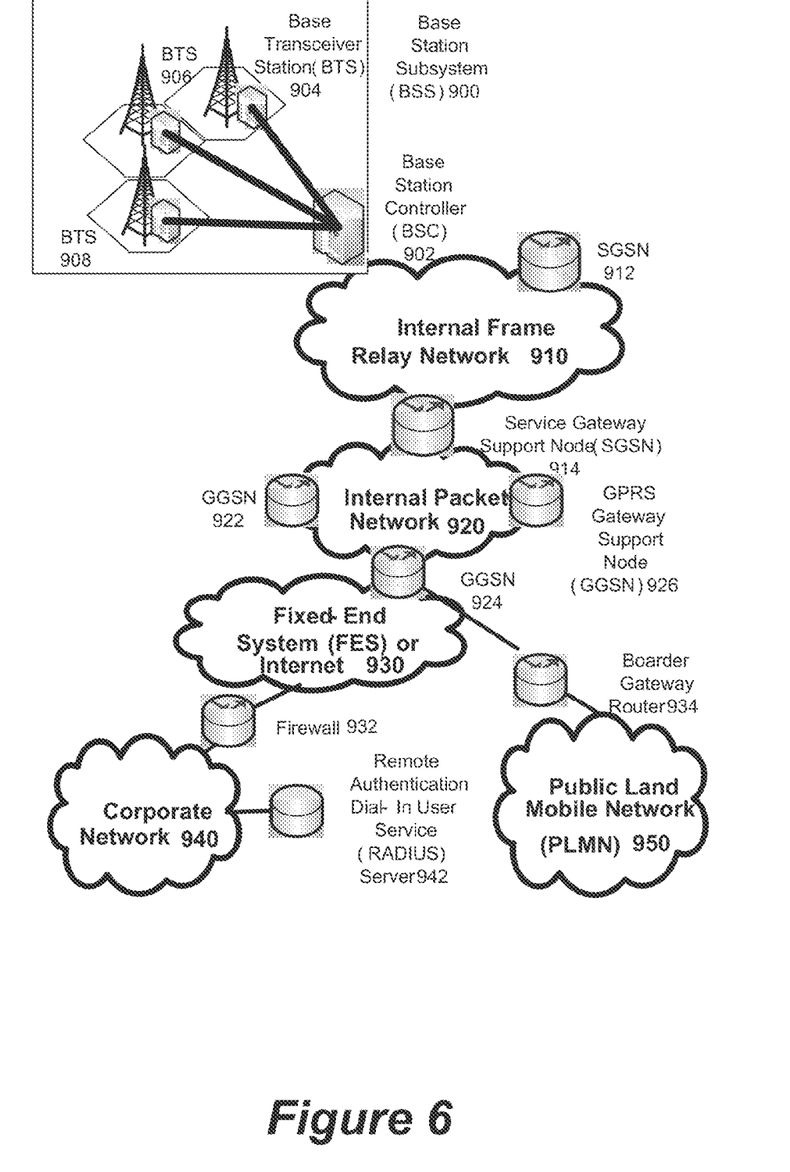
FIG. 6 is an overall block diagram of an exemplary packet-based mobile cellular network environment, such as a GPRS network, in which mapping of commercial mobile alert service messages to cell broadcasts may be implemented.

FIG. 6 depicts an overall block diagram of an exemplary packet-based mobile cellular network environment, such as a GPRS network, in which the systems and methods for mapping CMAS messages to cell broadcasts such as those described herein can be practiced. In an example configuration, the CMSP equipment as illustrated in FIGS. 1 and 2 may be encompassed by the network environment depicted in FIG. 6. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., wireless devices 161-164 and 261-264) become connected to the wireless network. In exemplary fashion, the packet traffic originating from user devices (e.g., wireless devices 161-164 and 261-264) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc. may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932, and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 7:
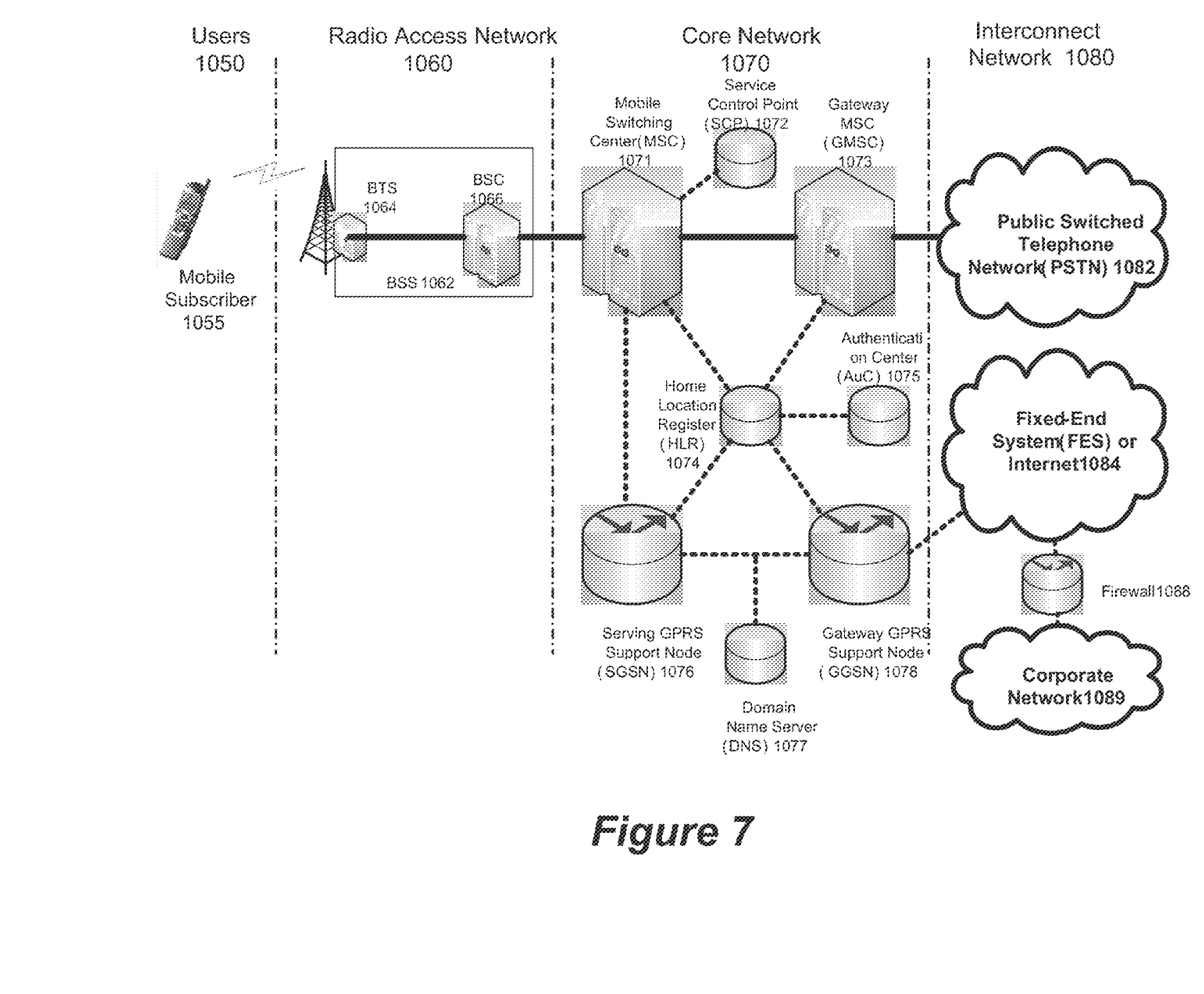
FIG. 7 illustrates a non-limiting, exemplary architecture of a typical GPRS network as segmented into four groups, in which mapping of commercial mobile alert service messages to cell broadcasts can be implemented.

FIG. 7 illustrates an architecture of a typical GPRS network segmented into four groups: users 1050, radio access network 1060, core network 1070, and interconnect network 1080. Users 1050 may comprise a plurality of end users (though only mobile subscriber 1055 is shown in FIG. 7). In an example embodiment, the device depicted as mobile subscriber 1055 may comprise wireless devices 161-164 and 261-264. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 7, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076, which then sends the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. HLR 1074 may store static information about the subscribers such as the International Mobile Subscriber Identity (IMSI), subscribed services, and a key for authenticating the subscriber. HLR 1074 may also store dynamic subscriber information such as the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as wireless devices 161-164 and 261-264, used by an end user of the mobile cellular service or a CMSP. When a mobile subscriber turns on his or her mobile device, the mobile device may go through an attach process by which the mobile device attaches to an SGSN of the GPRS network. In FIG. 7, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself with the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to the Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, which may be provisioned to map to one or more GGSN nodes in the core network 1070. Based on the APN, the mapped GGSN 1078 can access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality mapping CMAS messages to cell broadcasts such as those described herein can include but are not limited to Gateway GPRS Support Node tables, Fixed End System router tables, firewall systems, VPN tunnels, and any number of other network elements as required by the particular digital network.

Figure 8:
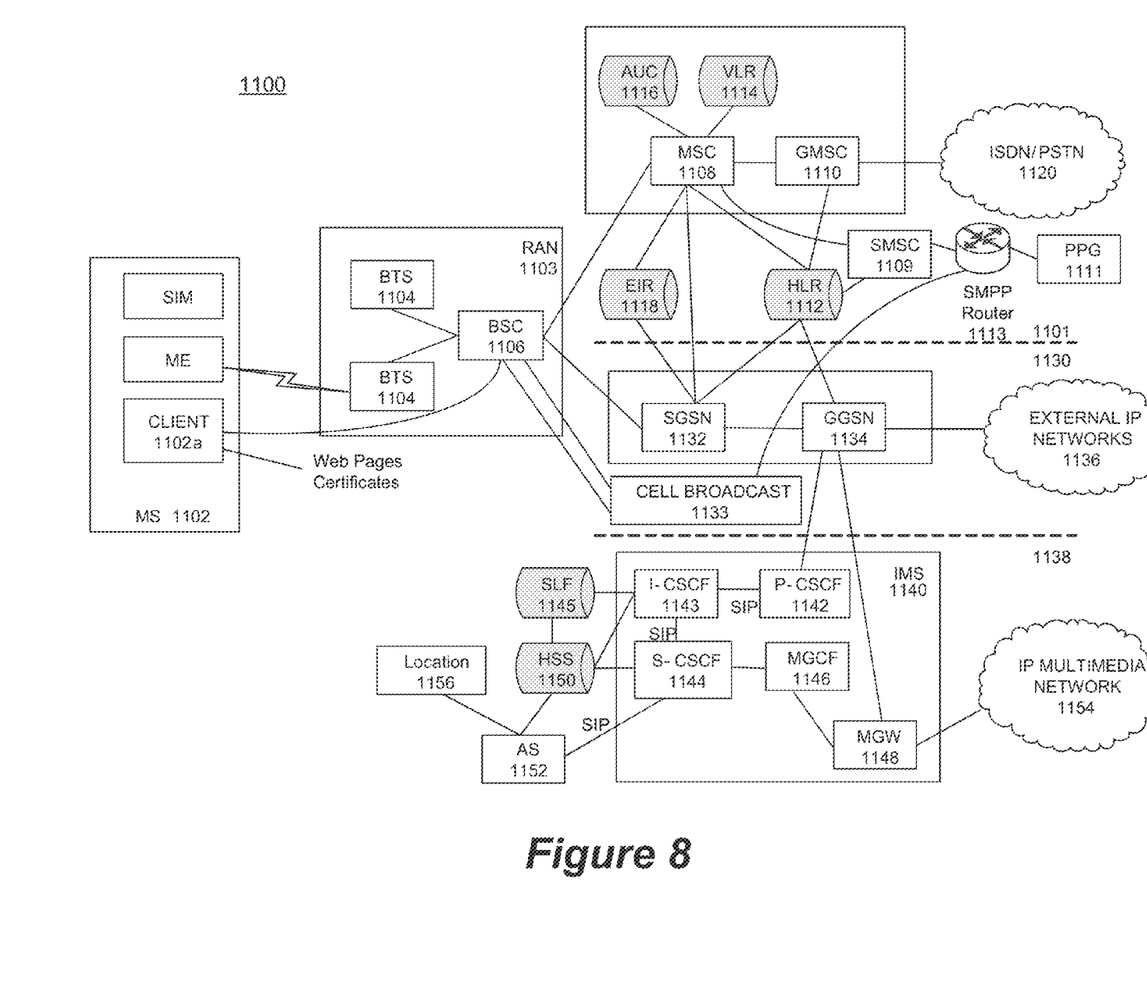
FIG. 8 illustrates a non-limiting alternate block diagram of an exemplary GSM/GPRS/IP multimedia network architecture in which mapping of commercial mobile alert service messages to cell broadcasts may be implemented.

FIG. 8 illustrates another exemplary block diagram view of a GSM/GPRS/IP multimedia network architecture 1100 in which the systems and methods for mapping CMAS messages to cell broadcasts such as those described herein can be incorporated. As illustrated, architecture 1100 of FIG. 8 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., wireless devices 161-164 and 261-264) that is used by mobile subscribers, on one embodiment with a Subscriber identity Module (SIM). The SIM includes an International Mobile Subscriber Identity (IMSI), which is a unique identifier of a subscriber. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 is a database that may contain administrative information regarding each subscriber registered in a corresponding GSM network. Such information may also include search lists, exclusion lists, and/or CMAS message mapping preferences for each subscriber. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The VLR may also contain search lists, exclusion lists, and/or CMAS message mapping preferences for each subscriber. The HLR 1112 and the VLR 1114, together with the MSC 1108, may provide the call routing and roaming capabilities of GSM, as well as CMAS message mapping functionality. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. The MS 1102 may send a location update including its current location information to the MSC/VLR, via the BTS 1104 and the BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

The GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

A Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

The GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1130 may be designed to operate in three network operation modes (NOM1, NOM2 and NOM3). A network operation mode of a GPRS network may be indicated by a parameter in system information messages transmitted within a cell. The system information messages may direct a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while receiving data and vice versa.

The IP multimedia network 1138 was introduced with 3GPP Release 5, and may include an IP multimedia subsystem (IMS) 1140 to provide rich multimedia services to end users. A representative set of the network entities within the IMS 1140 are a call/session control function (CSCF), a media gateway control function (MGCF) 1146, a media gateway (MGW) 1148, and a master subscriber database, called a home subscriber server (HSS) 1150. The HSS 1150 may be common to the GSM core network 1101, the GPRS network 1130 as well as the IP multimedia network 1138.

The IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

The I-CSCF 1143 forms an entrance to a home network and hides the inner topology of the home network from other networks and provides flexibility for selecting an S-CSCF. The I-CSCF 1143 may contact a subscriber location function (SLF) 1145 to determine which HSS 1150 to use for the particular subscriber, if multiple HSSs 1150 are present. The S-CSCF 1144 may perform the session control services for the MS 1102. This includes routing originating sessions to external networks and routing terminating sessions to visited networks. The S-CSCF 1144 may also decide whether an application server (AS) 1152 is required to receive information on an incoming SIP session request to ensure appropriate service handling. This decision is based on information received from the HSS 1150 (or other sources, such as an application server 1152). The AS 1152 may also communicate to a location server 1156 (e.g., a Gateway Mobile Location Center (GMLC)) that provides a position (e.g., latitude/longitude coordinates) of the MS 1102.

The HSS 1150 may contain a subscriber profile, including search lists, exclusion lists, and/or CMAS message mapping preferences, and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

The MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) The MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the pre-defined area. This registration, however, does not indicate the actual physical location of the mobile telephones outside the pre-defined area.

While example embodiments of systems and methods for mapping CMAS messages to cell broadcasts such as those described herein have been described in connection with various communications devices and computing devices/processors, the underlying concepts can be applied to any communications or computing device, processor, or system capable of implementing the CMAS message mapping systems and methods described. The various techniques described herein can be implemented in connection with hardware or software or, where appropriate, with a combination of both. Thus, the methods and apparatuses for CMAS message mapping systems and methods, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for CMAS message mapping. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and systems for CMAS message mapping as described herein can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for a CMAS message mapping system. When implemented on a general-purpose processor, the program code combines with the processor to provide a unique apparatus that operates to invoke the functionality of a CMAS message mapping system. Additionally, any storage techniques used in connection with a CMAS message mapping system can invariably be a combination of hardware and software.

While the systems and methods for mapping CMAS messages to cell broadcasts have been described in connection with the various embodiments of the various figures, it is to be understood that other similar embodiments can be used or modifications and additions can be made to the described embodiments for performing the same functions of CMAS message mapping system without deviating from the described systems and methods. For example, one skilled in the art will recognize that a CMAS message mapping system as described in the present application may apply to any environment, whether wired or wireless, and may be applied to any number of such devices connected via a communications network and interacting across the network. Therefore, CMAS message mapping systems such as those described herein should not be limited to any single embodiment, but rather should be construed in breadth and scope in accordance with the appended claims.

What is claimed is:

1. A system comprising:
a transmitter, a receiver, a processor, and a memory comprising computer-executable instructions, wherein the processor is communicatively connected to the transmitter, the receiver, and the memory;
wherein the receiver is configured to receive a commercial mobile alert message;

wherein the computer-executable instructions executed on the processor effectuate operations comprising:
  determining a message type parameter of the commercial mobile alert message;
  determining that the message type parameter does not correspond to an excluded message type parameter in an exclusion list stored in the memory;
  determining message contents of the commercial mobile alert message;
  mapping the commercial mobile alert message type parameter to an initial portion of a (Cell broadcast service) CBS-Message-Information-Page 1 parameter of a 3GPP (3rd Generation Partnership Project) Write/Replace message of Request/Indication primitive type;
  determining that a size of the message contents exceeds a size of a remaining portion of the CBS-Message-Information-Page 1 parameter of the 3GPP Write/Replace message of Request/Indication primitive type; and
  in response to determining that the size of the message contents exceeds the size of the remaining portion of the CBS-Message-Information-Page 1 parameter of the 3GPP Write/Replace message of Request/Indication primitive type:
    mapping a first portion of the message contents of the commercial mobile alert message to the remaining portion of the CBS-Message-Information-Page 1 parameter of the 3GPP Write/Replace message of Request/Indication primitive type; and
    mapping a second portion of the message contents of the commercial mobile alert message to a CBS-Message-Information-Page 2 parameter of the 3GPP Write/Replace message of Request/Indication primitive type; and
  wherein the transmitter is configured to transmit the 3GPP Write/Replace message of Request/Indication primitive type.

2. The system of claim 1, wherein the message type parameter comprises a severity indicator.

3. The system of claim 1, wherein the operations further comprise configuring the 3GPP Write/Replace message of Request/Indication primitive type with at least one of a serial number, a cell identifier, or a channel indicator.

4. The system of claim 2, wherein the message type parameter comprises at least one of a (Commercial Mobile Alert System) CMAS-Presidential, CMAS-Extreme -Alert-Message, CMAS-Severe-Alert-Message, or CMAS-Amber-Alert.

5. The system of claim 1, wherein the operations further comprise determining a subset of the cells within a network to which the 3GPP Write/Replace message of Request/Indication primitive type is to be transmitted.

6. The system of claim 1, wherein the operations further comprise prioritizing the commercial mobile alert message among a plurality of commercial mobile alert messages.

7. The system of claim 1, the transmitter further configured to transmit the 3GPP Write/Replace message of Request/Indication primitive type to a base station controller.

8. A non-transitory computer-readable medium comprising instructions for:
  receiving a commercial mobile alert message;
  determining a message type parameter of the commercial mobile alert message;
  determining that the message type parameter does not correspond to an excluded message type parameter in an exclusion list;
  determining message contents of the commercial mobile alert message;
  mapping the message type parameter to an initial portion of a CBS-Message-Information -Page 1 parameter of a 3GPP Write/Replace message of Request/Indication primitive type;
  determining that a size of the message contents exceeds a size of a remaining portion of the CBS-Message-Information-Page 1 parameter of the 3GPP Write/Replace message of Request/Indication primitive type;
  in response to determining that the size of the message contents exceeds the size of the remaining portion of the CBS-Message-Information-Page 1 parameter of the 3GPP Write/Replace message of Request/Indication primitive type:
    mapping a first portion of the message contents to the remaining portion of the CBS-Message-Information-Page 1 parameter of the 3GPP Write/Replace message of Request/Indication primitive type; and
    mapping a second portion of the message contents to a CBS-Message-Information -Page 2 parameter of the 3GPP Write/Replace message of Request/Indication primitive type; and
  transmitting the 3GPP Write/Replace message of Request/Indication primitive type.

9. The non-transitory computer-readable medium of claim 8, further comprising instructions for configuring the 3GPP Write/Replace message of Request/Indication primitive type with at least one of a serial number, a cell identifier, or a channel indicator.

10. The non-transitory computer-readable medium of claim 8, wherein the message type parameter comprises at least one of CMAS-Presidential, CMAS-Extreme-Alert-Message, CMAS-Severe-Alert-Message, or CMAS-Amber-Alert.

11. The non-transitory computer-readable medium of claim 8, further comprising instructions for determining a subset of the cells within a network to which the 3GPP Write/Replace message of Request/Indication primitive type is to be transmitted.

12. The non-transitory computer-readable medium of claim 8, further comprising instructions for prioritizing the CMAM among a plurality of CMAMs.

13. The non-transitory computer-readable medium of claim 8, wherein instructions for transmitting the 3GPP Write/Replace message of Request/Indication primitive type comprise instructions for transmitting the 3GPP Write/Replace message of Request/Indication primitive type to a base station controller.

14. A method comprising:
  receiving a commercial mobile alert message from an alert gateway at a cell broadcast center;
  determining a message type parameter of the commercial mobile alert message;
  determining that the message type parameter does not correspond to an excluded message type parameter in an exclusion list;
  determining message contents of the commercial mobile alert message;
  generating a 3GPP Write/Replace message of Request/Indication primitive type comprising the message type parameter and the message contents by:

mapping the message type parameter to an initial portion of a CBS-Message-Information-Page 1 parameter of the 3GPP Write/Replace message of Request/Indication primitive type, determining that a size of the message contents exceeds a size of a remaining portion of the CBS-Message-Information-Page 1 parameter of the 3GPP Write/Replace message of Request/Indication primitive type;

in response to determining that the size of the message contents exceeds the size of the remaining portion of the CBS-Message-Information-Page 1 parameter of the 3GPP Write/Replace message of Request/Indication primitive type:

mapping a first portion of the message contents to the remaining portion of the CBS-Message-Information-Page 1 parameter of the 3GPP Write/Replace message of Request/Indication primitive type; and mapping a second portion of the message contents to a CBS-Message-Information-Page 2 parameter of the 3GPP Write/Replace message of Request/Indication primitive type; and transmitting the 3GPP Write/Replace message of Request/Indication primitive type.

15. The method of claim 14, wherein the message type parameter comprises at least one of CMAS-Presidential, CMAS-Extreme-Alert-Message, CMAS-Severe-Alert-Message, or CMAS-Amber-Alert.

16. The method of claim 14, further comprising determining a subset of the cells within a network to which the 3GPP Write/Replace message of Request/Indication primitive type is to be transmitted.

17. The method of claim 14, further comprising prioritizing the commercial mobile alert message among a plurality of commercial mobile alert messages.

18. The method of claim 14, further comprising configuring the 3GPP Write/Replace message of Request/Indication primitive type with at least one of a serial number, a cell identifier, or a channel indicator.

19. The method of claim 14, wherein transmitting the 3GPP Write/Replace message of Request/Indication primitive type comprises transmitting the 3GPP Write/Replace message of Request/Indication primitive type to a base station controller.

20. The method of claim 14, wherein transmitting the 3GPP Write/Replace message of Request/Indication primitive type comprises transmitting the 3GPP Write/Replace message of Request/Indication primitive type to a radio network controller.

* * * * *